US012796783B2

(12) United States Patent
Boularan et al.

(10) Patent No.: US 12,796,783 B2
(45) Date of Patent: Nov. 17, 2026

(54) TRANSFER MODULE FOR A COMPONENT IN A PRODUCTION LINE AND MANUFACTURING FACILITY EQUIPPED WITH SUCH MODULES

(71) Applicant: Robert Bosch GmbH, Stuttgart (DE)

(72) Inventors: Christian Boularan, Luc-la Primaube (FR); Mikael Salvat, La Primaube (FR); Philippe Carvalho, Rodelle (FR); Patrick Gayrard, Druelle Balsac (FR); Patrick Juillaguet, Onet-le-Chateau (FR)

(73) Assignee: ROBERT BOSCH GMBH, Stuttgart (DE)

( * ) Notice: Subject to any disclaimer, the term of this patent is extended or adjusted under 35 U.S.C. 154(b) by 415 days.

(21) Appl. No.: 18/562,668

(22) PCT Filed: May 27, 2022

(86) PCT No.: PCT/EP2022/064465
§ 371 (c)(1),
(2) Date: Nov. 20, 2023

(87) PCT Pub. No.: WO2022/248700
PCT Pub. Date: Dec. 1, 2022

(65) Prior Publication Data

US 2024/0237786 A1 Jul. 18, 2024

(30) Foreign Application Priority Data

May 28, 2021 (FR) ....................................... 2105609

(51) Int. Cl.

| | |
|---|---|
| *A43D 111/00* | (2006.01) |
| *B23Q 1/03* | (2006.01) |
| *B25J 15/06* | (2006.01) |

(52) U.S. Cl.
CPC .......... *A43D 111/003* (2013.01); *B23Q 1/035* (2013.01); *B25J 15/0616* (2013.01)

(58) Field of Classification Search
CPC .... A43D 111/003; B23Q 1/035; B23Q 1/037; B25B 1/2421
See application file for complete search history.

(56) References Cited

U.S. PATENT DOCUMENTS 4,200,272 A * 4/1980 Godding ............... B25B 1/2421 269/26
4,896,086 A 1/1990 Miyahara et al.
(Continued)

FOREIGN PATENT DOCUMENTS

CN 105492162 A 4/2016
CN 105686215 A 6/2016
(Continued)

OTHER PUBLICATIONS

International Search Report for PCT/EP2022/064465, Issued Sep. 5, 2022.

*Primary Examiner* — Tyrone V Hall, Jr.
(74) *Attorney, Agent, or Firm* — NORTON ROSE FULBRIGHT US LLP

(57) ABSTRACT

A transfer module for components held in position on the module, which circulates in a production line that is equipped with workstations. The module has a plate provided with reference positions, of which at least certain positions are equipped with lowerable pins, which can be moved between a position in which they are lowered beneath the surface of the plate and a position in which they are extended out of the plate, so as to receive the component which to be held on the plate.

12 Claims, 9 Drawing Sheets

(56) References Cited

U.S. PATENT DOCUMENTS

| | | | |
|---|---|---|---|
| 5,984,293 A | 11/1999 | Abrahamson et al. | |
| 6,799,757 B1 | 10/2004 | Lang | |
| 2016/0021982 A1 * | 1/2016 | Davis | B23Q 3/186<br>29/559 |

FOREIGN PATENT DOCUMENTS

| | | |
|---|---|---|
| CN | 107732132 A | 2/2018 |
| CN | 111936249 A | 11/2020 |

* cited by examiner

TRANSFER MODULE FOR A COMPONENT IN A PRODUCTION LINE AND MANUFACTURING FACILITY EQUIPPED WITH SUCH MODULES

FIELD

The present invention relates to a transfer module for a component in a production line and to a product manufacturing facility equipped with such a production line.

BACKGROUND INFORMATION

There are production facilities, in particular in the field of footwear production, which use a production line equipped with various manufacturing stations and in which transfer modules circulate, to which components are fastened. For this purpose, transfer modules have pins, and the components are provided with perforations that correspond to the location of the pins in order to be held by the pins on the module.

These facilities are relatively complex, since the transfer modules are provided for a precise component and cannot be used for different components that are, for example, modified in a series of components of which the dimensions vary, wherein the shape remains the same in order to be processed in this same production line.

This disadvantage is particularly serious, since it requires the production of modules designed for each particular shape of component.

SUMMARY

An object of the present invention is to provide a transfer module that is adaptable to different types of components in order to fasten the components to pins and enable their transfer to the various stations of the production line.

For this purpose, the present invention includes a transfer module for components that are held in position on the module by pins and circulate in a production line that is equipped with workstations. According to an example embodiment of the present invention, this module has a plate provided with reference positions, of which at least certain positions are equipped with lowerable pins, which can be moved between a position in which they are lowered beneath the surface of the plate and a position in which they are extended out of the plate so as to receive the component which is to be held on the plate.

This transfer module may have many advantages over convention transfer modules with a plate which are equipped with stationary studs, since it enables a highly flexible adaptation for the diversification of a production line. The transfer module according to the present invention reduces the number of modules to be stored depending on the types of components to be fastened to the plate of a module, since the modules do not have to be exchanged in a production line. The module is highly efficient, since it can be easily freed from production waste for immediate reuse.

The simplicity of the module for its use despite the very great diversity and possibilities results from the fact that the module is passive; it has neither a motor nor an actuator and therefore requires no connection for its power supply.

According to a further feature of the present invention, the reference positions are distributed according to a grid with coordinates that mark each position and its possible occupation by a lowerable pin. This enables a very large diversification of the reference points and at the same time guarantees the precision of control of the activation of the plate.

According to a further feature, the plate is formed by a board that is provided with bores at the reference positions and a honeycomb-shaped base, the recesses of which correspond to the bores of the reference positions of the board, wherein the selected recesses have lowerable pins that are inserted into the bores of the board.

This module can be easily adapted by changing the number of reference points and blocks along with their locations. It is sufficient to remove the plate from the carrier to access the blocks and the recesses receiving them in order to move, remove or add the blocks.

These advantages are particularly evident if the lowerable pin is integrated into a block, which is housed in a recess of the base of the plate, and the block is held by the carrier plate of the frame, which is provided with bores or openings that enable access to the piston of the block that is placed in a recess.

According to a further advantageous feature of the present invention, the block is a cylinder that receives a piston provided with a pin, wherein the piston is movable in the cylinder between a first and a second position by being held in each position by a holding device.

This embodiment of the present invention is particularly simple and reliable.

According to a further feature of the present invention, the holding device is a clip-in device in order to interact with the piston in its lowered position or in its retracted position.

This type of hold is smooth and easy to control, in particular if the clip-in device consists of a ball combined with a spring and two grooves in the surface of the cylinder, wherein these grooves are assigned to one and the other position of the piston, respectively, wherein the spring pushes the ball into a position projecting from the surface of the cylinder in order to enter the groove of the piston, which has arrived opposite the ball, wherein this ball is able to be pushed back under the effect of a thrust exerted by the piston on the ball, in order to be lowered beneath the surface of the cylinder, compressing the spring and enabling the release of the piston.

According to a further feature of the present invention, the board is a steel plate, the surface of which is non-reflective and which is separated from the base by a heat-insulating plate. This board, which receives the pins, makes it possible to hold them well in the extended position. It withstands mechanical effects and prevents accidental reflections of any laser beam that is used for an operation carried out on the component.

The present invention also relates to a product manufacturing facility that contains a production line with workstations and conveying devices that circulate between the workstations and transport modules that carry components to be processed in the stations, wherein these modules are as defined above.

This facility combines all the advantages of the simplicity of the functional design and the reliability of the transfer modules.

According to a further feature of the present invention, the facility contains a management unit that controls the movement of the conveying devices and the operations carried out in the station according to a defined program. This management unit guarantees the functional flexibility of the facility and the diversification of the operations possible in the same facility with the same transfer modules.

According to a further feature of the present invention, the facility contains an activation device of the transfer module, in order to actuate the blocks and extend their pin according to the component to be received on the module.

According to a further feature of the present invention, the activation device consists of two longitudinal rails that surround a receiving point of a plate and carry a transverse rail provided with a transverse slide that is equipped with an actuator in order to arrive at the selected position of a reference point, in order to push its piston and extend the pin of the block from this selected reference point.

This activation device is easy to control despite the large number of possible positions for reference points.

According to a further feature of the present invention, in the activation device, the transverse rail is carried by two longitudinal slides that are driven synchronously on the longitudinal rails by a screw-and-nut gearbox that is assigned to each slide and its longitudinal rail and is driven by a motor and a transverse shaft that is connected to the two screws, wherein the transverse slide is driven by a screw-and-nut gearbox that is integrated into the transverse rail and actuated by a motor carried by the transverse rail.

This design of the activation device makes it possible in particular to divide the transverse rail and thus the actuators in order to reduce the movements of the activation device and thus the time required to activate the plate of a module.

According to a further feature of the present invention, the facility contains a dispensing station that consists of a removal and cleaning station, which has a portal frame with a rail that covers the transfer module that has arrived in the dispensing station, and is provided with a slide that is equipped with a gripping device upstream and a cleaning device downstream, in order to place the gripping device over the transfer module and remove the product, and then to displace it, in order to dispense the product and simultaneously activate the cleaning device as it passes over the empty transfer module in order to clean it.

This design is simple and efficient.

According to a further feature of the present invention, the gripping device in the facility has a gripping head with suction cups supplied with negative pressure, and the cleaning device contains an air nozzle supplied with compressed air.

Such a gripping device is like diversifying the production line; it adapts in a versatile way to many shapes of products that are not necessarily flat.

According to a further advantageous feature of the present invention, the device for returning the facility to the initial state in order to lower the extended pins of the plate consists of a plate for retracting all the pins of a plate to the plane of the upper side of the plate of the transfer module.

This design is particularly simple.

BRIEF DESCRIPTION OF THE DRAWINGS

The present invention is described in more detail below with the aid of an example embodiment of a transfer module and a production line equipped with such transfer modules.

DETAILED DESCRIPTION OF EXAMPLE EMBODIMENTS

The present invention relates to a component transfer module 1 for manufacturing products on a production line LP, which is equipped with workstations OP1-OP3 in order to transfer the components from the entrance of the line for dispensing products.

In order to simplify the description, it is agreed that a product to be produced may require one or more components that are covered here by the expression "the component." The component is an element that belongs to the manufacture of the product, or is transformed by means of processing through cutting, deformation, chemical action or other means in order to obtain the product.

Due to the diversity of the two-dimensional or three-dimensional shapes it can have, the component is not shown.

The need to which the present invention responds is to position the component precisely on a module 1 at the entrance to the production line LP, so that it arrives in a precise position at a station OP1-OP3 in order to carry out the operations.

The product to be produced can be a finished or semi-finished product, which then forms a component that is used in a further production line.

Figure 1:
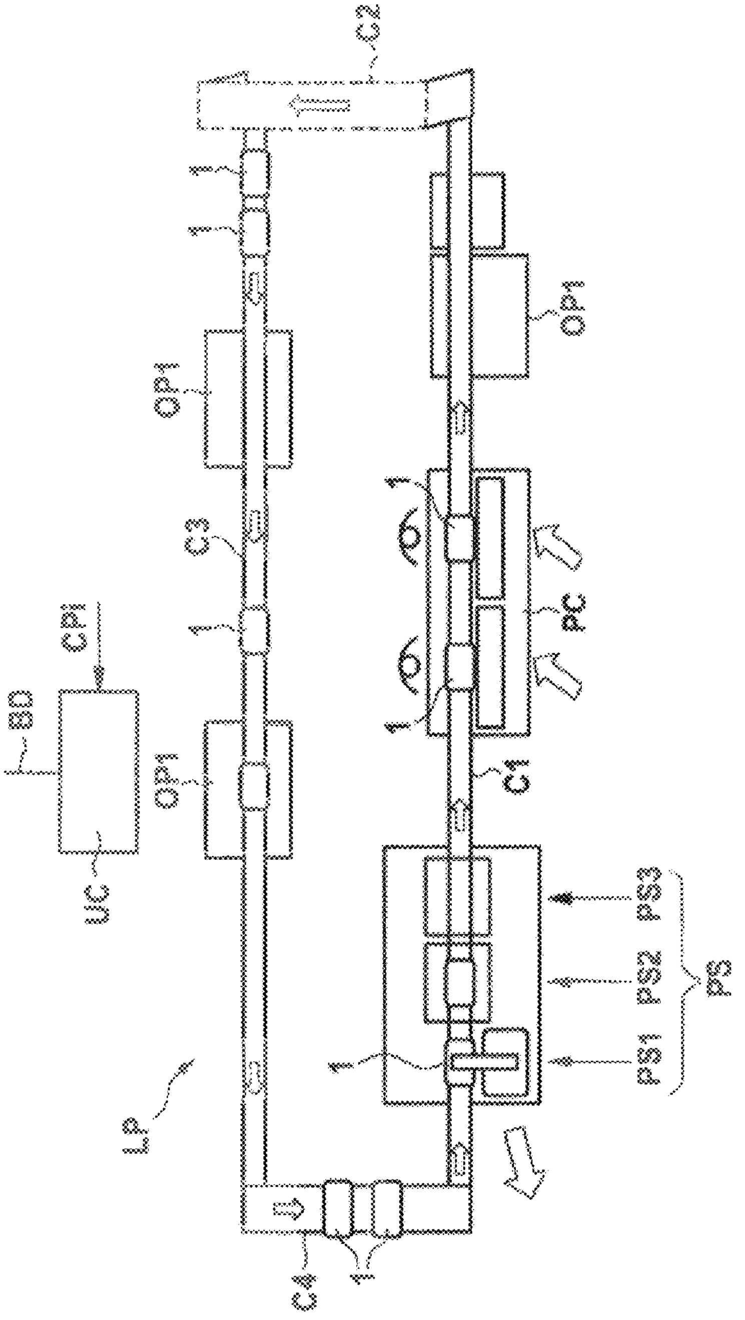
FIG. 1 shows a schematic representation of a production line equipped with transfer modules, according to an example embodiment of the present invention.

A production line LP is shown in FIG. 1. It consists of conveying devices C1-C4 that displace the modules 1 between the loading station PC of the component on a module 1, then the transition to the ready-to-operate stations OP1 . . . OP3 that carry out the various operations in order to arrive at the product.

At the entrance of the line, the component is installed in a precise position on the transfer module 1 in the loading station PC.

At the end of the line, the module 1 arrives at the dispensing station PS, where:

- the product 1 is removed from the module 1 (PS1),
- the module 1 is cleaned (PS2), and
- the module is reset (PS3) in order to be ready to return to the PC charging station.

The production line LP is equivalent to a circuit that connects the dispensing station PS to the entrance, which is a loading station PC. This circuit can have a branch to remove or insert modules 1 through types of switch connections, depending on the requirements of the operations and the flow of necessary modules.

The various automatic or manual movements and operations are managed by a central unit UC, which uses the signals from sensors CPi and information from a database 3D in order to control the movements and operations. These operations can be user-adapted from one module 1 to another or be the same in groups of modules or standardized by series of modules.

The different ways of loading a module 1 can vary from one transfer module to another on the production line and require the adaptation of the module(s).

This adaptation and functional flexibility is made possible by the adaptation features of the transfer modules 1 and their management.

More precisely, the components are carried by transfer modules 1 between the entrance PC and the dispensing PS of the production line LP, with the return of the transfer modules 1, which circulate in a circle. The modules 1 are transported by conveying devices C1-C4 that pass through the various stations (OP1, OP2, OP3, PS, PC), endlessly or in start/stop mode with the possible retention of modules 1 in one or the other station, depending on the operations.

Figure 2:
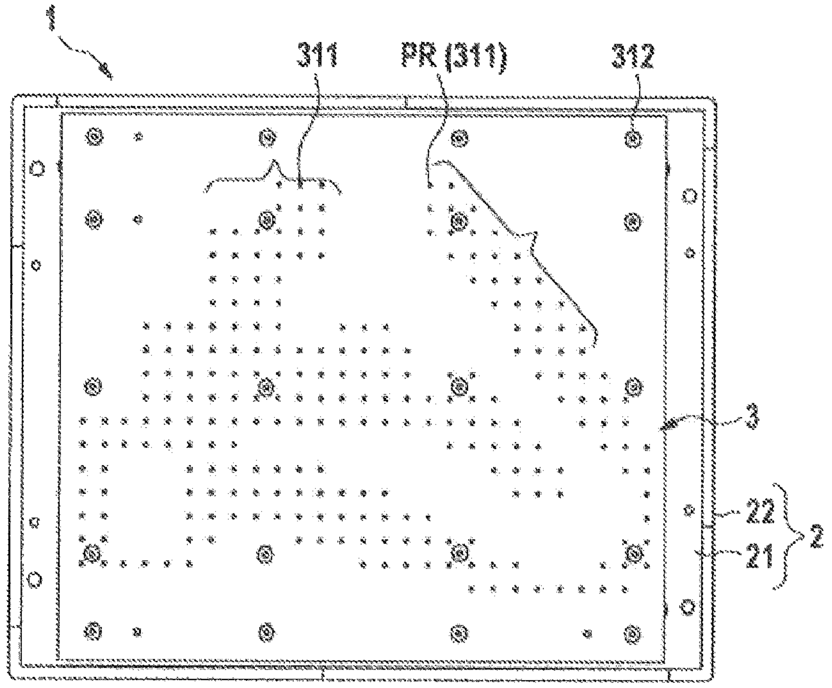
FIG. 2 shows a top view of a transfer module, according to an example embodiment of the present invention.
Figure 3:
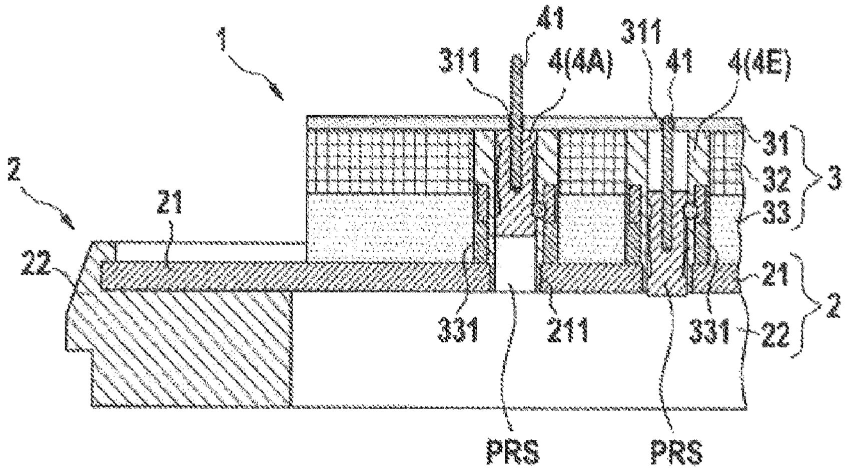
FIG. 3 shows a view in an enlarged scale of a cross-section of the transfer module of FIG. 2, according to an example embodiment of the present invention.

FIG. 2 is a plan view of a transfer module 1 according to the present invention, and FIG. 3 is its enlarged partial sectional view.

The transfer module 1 consists of a frame 2, in particular a standard frame, compatible with the conveying devices C1-C4, which are themselves standard. The frame 2 carries a plate 3 consisting of a base 33, which is covered by a board 31, possibly with the interposition of a heat-insulating intermediate plate 32.

The plate 3 receives the component and holds it in a precise position that allows the various operations to be carried out in the OP1-OP3 stations of the production line LP.

The frame 2 consists of a carrier plate 21 connected to a sliding piece 22 for the transport of the module. The carrier plate 21 receives the plate 3 to which it belongs, as explained below.

The board 31 is a plate with a distribution of reference points PR, for example according to a uniform grid or according to groups of reference points PR materialized by bores 311, for the passage of the lowerable pins 41 integrated into the thickness of the plate 3. For example, the plate 3 is fastened to the carrier plate 33 by screws 312.

According to this example, the plate 3 consists of a board 31 made of steel, the surface of which is non-reflective in order to avoid the reflection of radiation, for example in the case of an operation using a laser beam, onto the production line.

The board 31 is connected to the base 33 by a heat-insulating intermediate plate 32, which neutralizes the effect of the heat conduction of the board to the core of the plate 3, in particular to the blocks 4.

In the simplest general case, the reference points are PR bores 311, which are distributed according to an orthonormal grid and marked by their coordinates.

The reference points PR represent possible fastening points of the component to the plate 3. Depending on its shape and purpose, the component is fastened to a certain number of selected reference points PRS among the set of possible reference points PR that are provided on the board 31.

In the particular case of facilities intended for one type of manufacturing, the board 31 may have only a limited number of reference points PR, depending on the general shape of the components to be received.

In one case or another, the reference points PR are selected and receive a lowerable pin 41. All or only some of the lowerable pins 41 of the selected reference points PRS are activated depending on the characteristics of the component to be received. The pins of the other blocks 4 remain lowered.

The board 31 is combined with the base 33, which has a honeycomb structure of which the recesses 331 are assigned to the reference points PR.

For example, the section of FIG. 3 shows selected reference points PRS, since certain recesses are equipped with a block 4; the left block 4A is activated, while the right block 4E is not activated, wherein its pin 41 is left lowered.

Thus, the plate 3 shows a double organization of reference points PR:

- the totality of all generally possible reference points, which is the accumulation of all reference points that can be finally selected for each plate 3,
- the totality of reference points PR for a pallet of components of the same general shape that vary only by their dimensions, for example to create a pallet of products that have the same general shape; only in this sub-unit are the selected reference points PRS for each component of a pallet located, such as a footwear item that is made in a range of sizes.

Figure 4A:
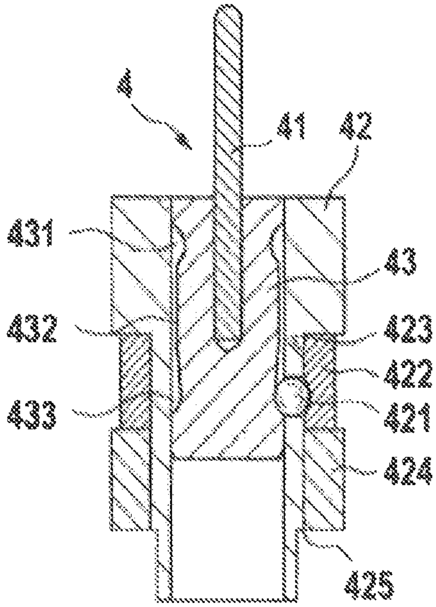
FIG. 4A shows a sectional view of a block in the extended position of the pin, according to an example embodiment of the present invention.
Figure 4B:
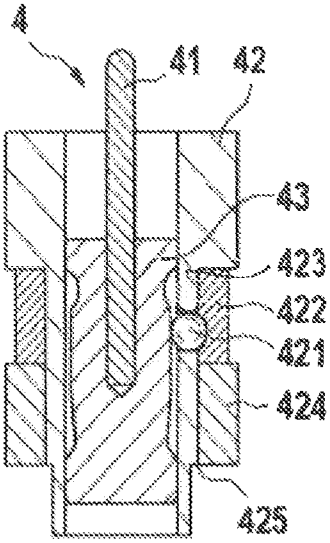
FIG. 4B shows a sectional view of the block in intermediate position, according to an example embodiment of the present invention.
Figure 4C:
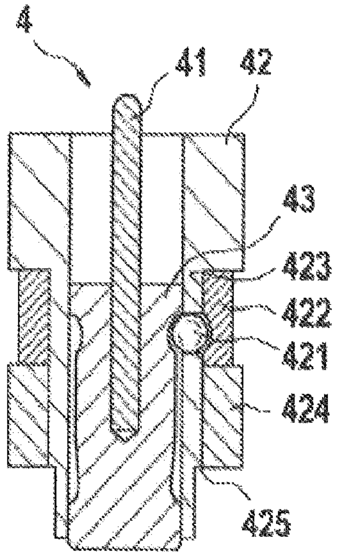
FIG. 4C shows a sectional view of the block in the retracted position of the pin, according to an example embodiment of the present invention.

According to FIGS. 4A, 4B, 4C, a block 4 consists of a cylinder 42 that is open at both ends and receives a piston 43 that is provided with a pin 41 protruding in the axis of the piston. The piston 43 can be displaced by an external effect between its activated position (FIG. 4A) protruding from the plate 3 and its lowered position (FIG. 4C) and vice versa.

The two positions are defined by a clip-in element: The surface of the piston 43 is provided with two grooves 431, 432, and the cylinder 42 has a clip-in element 421, for example in the form of a lowerable ball, which is pushed by a spring 422 in order protrude from the surface of the cylinder. The spring 422 can consist of an elastic ring, which is housed in a groove 423 of the cylinder and thus surrounds the clip-in element 421 like the ball. There could also be two or three clip-in elements in the form of balls that are distributed on a circle and subjected to the effect of the elastic ring 422. The groove 423 receiving the elastic ring 422 is formed by a reduction in the diameter of the cylinder 42, which receives a blocking ring 424, which also completes the shoulder 425.

The cross-section of each of the grooves 431, 433 and the diameter of the ball 421 correspond, such that each groove can position itself well on the ball.

Each groove 431, 433 preferably has a circular arc cross-section slightly widened on the side of the other groove, in order to form a ramp 432, which allows the piston 43 to progressively push back the ball 421 if the piston is pushed in the direction of the extension of the pin 41 (FIG. 4A) or its lowering (FIG. 4C).

In contrast, the other edge (or outer edge) of each groove 431, 433 has no ramp and thus forms an end stop that holds the piston 43 back in this direction and that can only be displaced between these two end positions.

FIG. 4B shows an intermediate position of the piston 43, which passes over the ball 421 with its ramp 432.

The grooves 431, 433 and the ramp 432 are rotationally symmetrical shapes of the piston 43, such that the orientation of the piston 43 about its axis has no significance for the interaction with the ball 421.

Figure 5A:
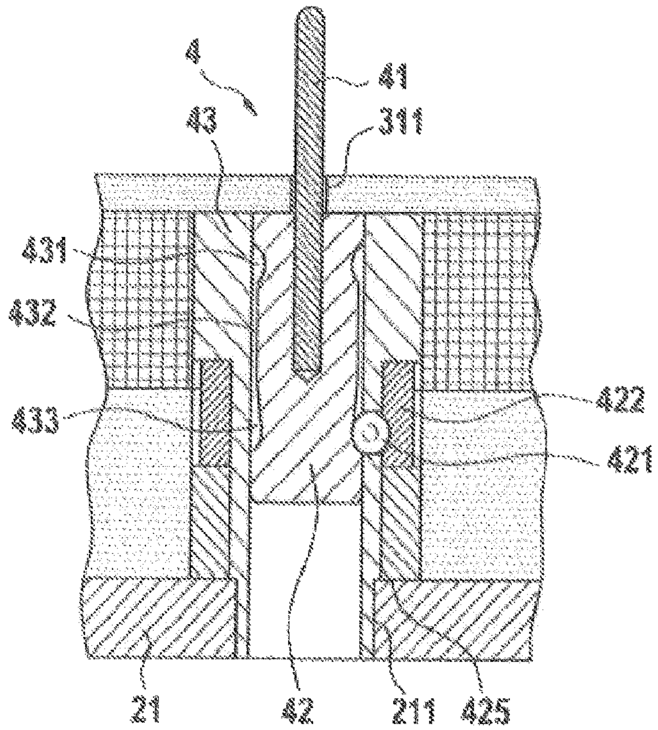
FIGS. 5A and 5B show sectional views in an enlarged scale of a plate with an extended pin (FIG. 5A) and a lowered pin (FIG. 5B).
Figure 5B:
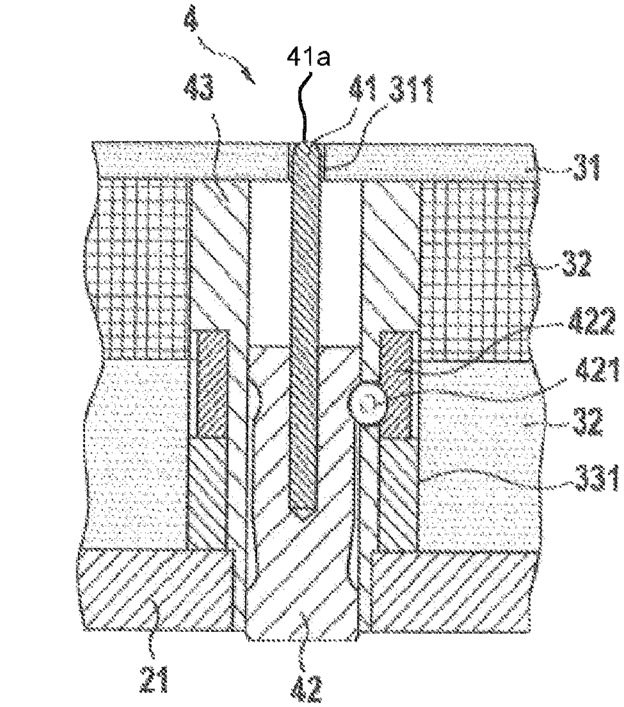

FIGS. 5A and 5B show the installation of a block 4 in the plate 3, which is held between the board 31 and the carrier plate 21, which is provided with a bore 211 at the location of the block 4. The bore 211 receives the reduction in diameter of the cylinder 42, which forms the shoulder 425, which, as already indicated, is completed by the blocking ring 424 and allows access to the piston 43.

FIG. 5B also clearly shows the rounded, for example ball-shaped, end 41*a* of the pin 41, which protrudes slightly but neutrally beyond the surface of the board 31, so that the bore 311 does not form a cavity, even reduced, which could favor the deposition and settling of residues of machining operations that could possibly block the pin 1 and be difficult to remove.

Figure 6:
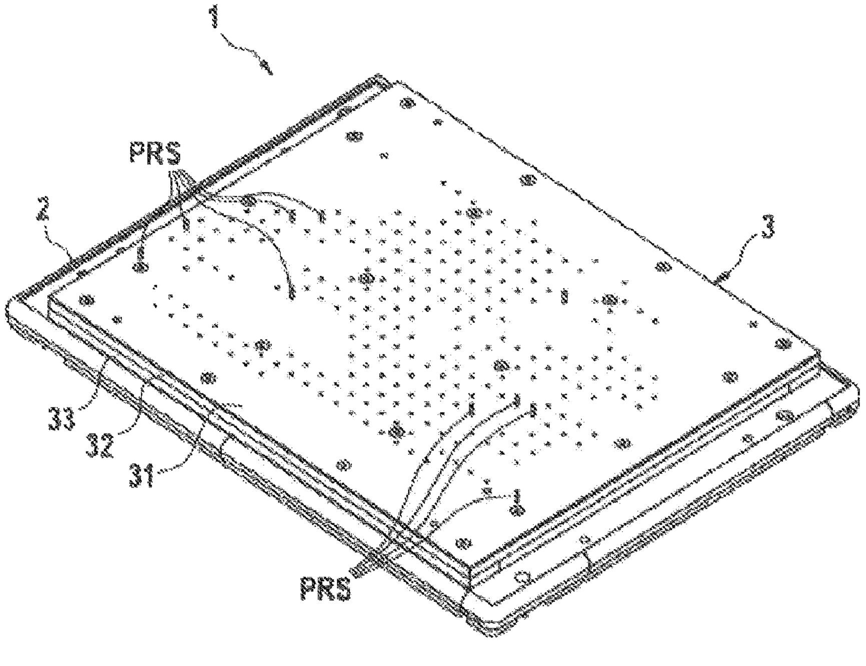
FIG. 6 shows a perspective view of a module with a plate of which the pins are extended, according to an example embodiment of the present invention.

FIG. 6 shows an example of a transfer module 1, the selected reference points PRS of which have been activated, wherein the pins 41 have been extended. The distribution of the reference points PR corresponds to the example shown in FIG. 2. The plate 3 is fastened to the carrier plate 21 of the frame 2 by screws 34 that are distributed on the surface of the plate 3 in order to fasten it firmly to the plate 21 and thus to the frame 2, in order to prevent the thrust exerted on the pistons 43 of the blocks 4 for extending the pins 41 from lifting the plate 3; this distribution of fastening screws also guarantees the precision of the positioning of the plate 3 in the stations OP1-OP3 and during unloading and resetting in the dispensing station PS3.

Figure 7:
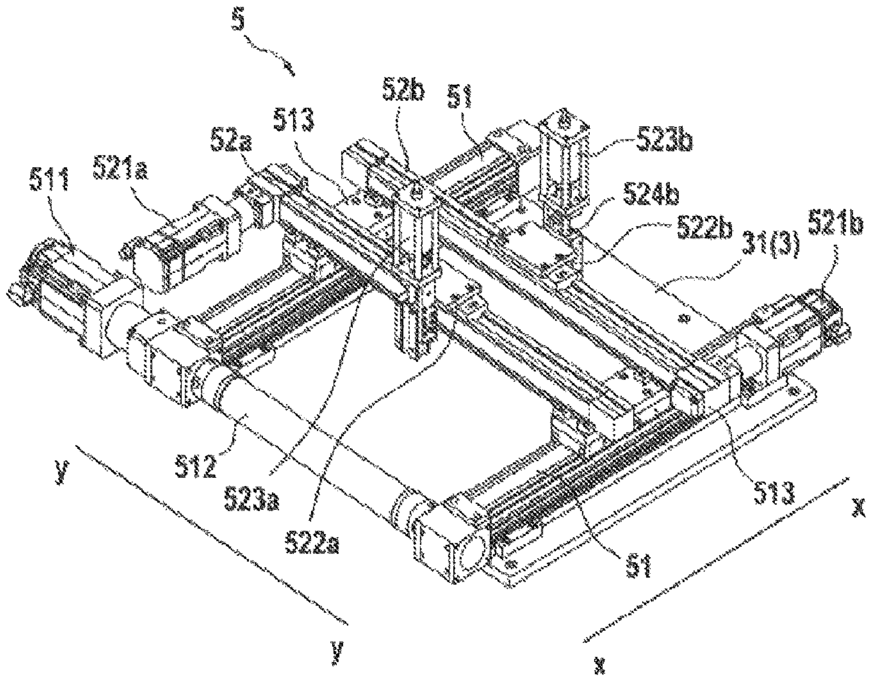
FIG. 7 shows a perspective view of an activation device of a transfer module, according to an example embodiment of the present invention.

FIG. 7 is a perspective view of an activation facility 5 of the plate 3 of a module 1 according to a view from below; this view limited to the board 31 has a coordinate axis cross (XX, YY) for information. The facility 5 consists of two parallel longitudinal rails 51 corresponding to the direction XX, on which a transverse rail 52*a* circulates, which corresponds to the direction YY and which carries a transverse slide 522, which is movable along this rail 52*a*. The longitudinal rails 51 surround the point that receives the transfer module 1, and their length allows the transverse rail 52*a* to sweep over this entire point, so that the transverse slide 522*a* with its actuator, as described below, can reach all the reference points PR, that are equipped with a block 4.

The transverse rail 52*a* is driven in the translational direction by a motor 511, the output of which is a transverse shaft 512 that drives a stationary longitudinal screw (not shown), which is integrated into each longitudinal rail 51, which cooperates with a nut that is freely rotatable but fixed in translation to each slide 513 that carries the transverse rail 52*a*.

The end of the transverse rail 52*a* is equipped with a motor 521 that drives a stationary screw that is housed in the transverse rail and interacts with a nut firmly connected to the transverse slide 522*a*.

The transverse slide 522*a* carries an actuator 523*a*.

The pneumatic or electromechanical actuator 523*a* has a rod 524, which is movable in the direction perpendicular to the plane of the longitudinal rails 51.

According to the illustrated embodiment, the transverse rail 52*a* is split with a further transverse rail 52*b*, which carries a transverse slide 522*b* independent of the slide 522*a*, which circulates on the first transverse rail 52*a*. This doubling of the slides 522*a*, 522*b* reduces the paths in the direction XX, since the slides divide the plate 3 into two halves, which reduces the preparation time of a module 1.

Each slide 522*a,b* is controlled by the central unit UC according to a program to come in front of the block 4 to be activated and to push the piston 43 of the block into the activated position and let the pin 41 protrude from the board 31.

The putting out of operation of the plate 3, which is upstream of the activation of the plate, i.e. the lowering of the pins 41, is preferably carried out globally with a single plate, which is applied to the upper side of the pins 41 of a module 1 and pushes them in until they are lowered into the board 31 of the module 1, which is thus returned to its initial state.

The module 1 can then be reset by activating the blocks 4 that are required for the new operating cycle of the module 1.

Cleaning the plate 3 at the end of a circle is necessary so that it can be used for the new component and also to avoid the risk of the pins 41 becoming blocked in the bores 311 of the board 31 by the waste from operations carried out on the production line.

Figure 8:
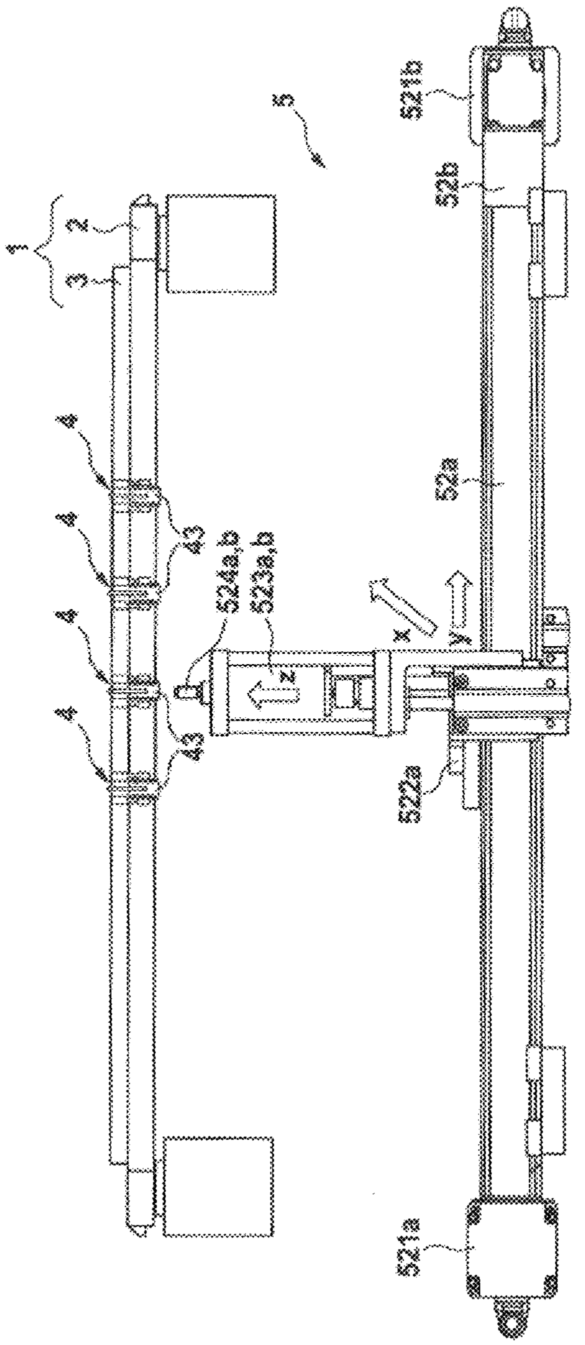
FIG. 8 shows a front view of the activation device of FIG. 7, according to an example embodiment of the present invention.

FIG. 8 is a front view of the activation facility 5 of the blocks 4 of the plate 1. The plate 1, from which the product has been removed and which has been cleaned, arrives in a precise position above the facility 5, the representation of which is limited to the part containing the transverse rail 52*a,b*, of which an actuator 523*a,b* is positioned under a block 4 to be activated by the rod 524*a,b*, which pushes the piston to extend the pin 41.

Figure 9:
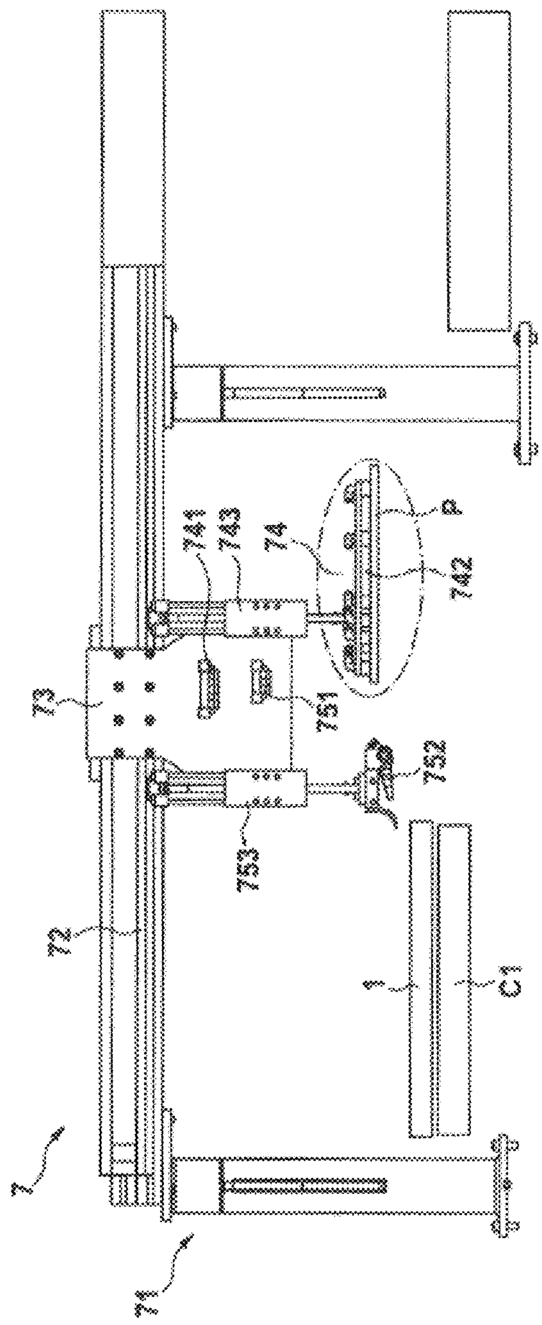
FIG. 9 shows a front view of the dispensing station, according to an example embodiment of the present invention.

FIG. 9 is a schematic view of the dispensing station 7 of the product P, which is represented by a flat element.

The dispensing station 7 corresponds to the unloading station PS1 and the cleaning station PS2, which are shown in FIG. 1.

The station 7 is a portal frame with a rail 72 guiding the slide 73, which is equipped with a gripping device 74 and a cleaning device 75, each of which is assigned to a distributor 741, 751, which supplies the negative pressure or pressure to the head with suction cups 742 of the gripping device 74, which operates with negative pressure, and the pressure to the cleaning nozzle 752 of the cleaning device 75.

The gripping head 742 is carried by a working cylinder 743, which controls its vertical movement; the air nozzle 742 is carried by a working cylinder 753, which controls the vertical movement of the slide 73, which first positions itself on the gripping head 742 above the plate 1 and then takes the product P and is displaced to the right, while the air nozzle 752 is lowered onto the plate 1 and sweeps it with a stream of air, by passing transversely through the plate 3 to arrive at the position shown. The gripping head 742 then releases the product.

The plate 1 cleaned in this way can be put out of operation by lowering all its pins 41 and then transferred to the reset station PS3, which is equipped with the facility 5 of FIG. 9.

The present invention thus relates to a product manufacturing facility containing a production line with workstations and conveying devices circulating between the stations and carrying the components to be processed in the stations, characterized in that it contains transfer modules 1 as described above for transferring the components between the various stations OP1-OP3, PC, PS of the production line LP.

LIST OF MAIN ELEMENTS

LP Production line
P Product
C1-C4 Conveying device

OP1-OP3 Ready-to-operate station
PS Dispensing station
PS1 Unloading station
PS2 Cleaning station
PS3 Reset station
PC Charging station
PR Reference point
PRS Selected reference point
UC Central unit
1 Module
2 Frame
21 Carrier plate
211 Bore
22 Sliding piece
3 Plate
31 Board
311 Bore
32 Heat-insulating intermediate plate
33 Base (honeycomb base)
331 Recess
34 Fastening screw
4 Block
41 Pin
41*a* Rounded end
42 Cylinder
421 Ball, clip-in element
422 Spring, elastic ring
423 Groove
424 Blocking ring
425 Shoulder
43 Piston
431 Lowering groove
432 Ramp
433 Extending groove
5 Activation facility of a plate
51 Longitudinal rail
511 Motor
512 Transverse shaft
513 Longitudinal slide
52*a,b* Transverse rail
521*a* Motor
522*a* Transverse slide
522*b* Transverse slide
523*a* Actuator
523*b* Actuator
524 Rod of the actuator
524*b* Rod of the actuator
53 Cleaning device
6 Plate for putting the pins of a plate out of operation
7 Removal and cleaning station
71 Portal frame
72 Rail
73 Slide
74 Gripping device
741 Distributor
742 Gripping head
743 Working cylinder
751 Distributor
752 Air nozzle
753 Working cylinder

The invention claimed is:

1. A transfer module for a component, wherein the transfer module is a passive module that is configured to circulate in a production line that is equipped with workstations, the transfer module comprising:

a frame that is compatible with a conveying device of the production line, wherein:

the frame carries a first plate that is provided with reference positions;

at least a subset of the reference positions are equipped with lowerable pins that are movable between a lowered position in which they are beneath a surface of the first plate and an extended position in which they are extended out of the first plate so as to receive the component and hold the component on the first plate;

the first plate is formed by (a) a honeycomb-shaped base and (b) a board that is provided with bores at the reference positions;

recesses of the honeycomb-shaped base correspond to the bores of the board at the reference positions;

one or more of the recesses are equipped with respective ones of the lowerable pins that are inserted into respective ones of the bores of the board;

the frame includes a second plate, the second plate being a carrier plate having bores or openings;

each respective one of the lowerable pins is integrated into a respective block that is held by the carrier plate and that is housed in a respective one of the recesses of the base;

the respective block is a cylinder that accommodates a respective piston that:

(a) is provided with the respective lowerable pin of the respective block;

(b) is movable between (1) a first position in the cylinder corresponding to the extended position of the respective lowerable pin and (2) a second position in the cylinder corresponding to the lowered position of the respective lowerable pin; and (c) is retained in whichever one of the first and second positions the respective piston occupies by a clip-in holding device that is configured to interact with the respective piston; and the bores or openings of the carrier plate enable access to the respective pistons of the respective blocks.

2. The transfer module according to claim 1, wherein the reference positions are distributed according to a grid with coordinates that mark each of the reference positions and its possible occupation by one of the lowerable pins.

3. The transfer module according to claim 1, wherein:

the clip-in device includes a ball combined with a spring and two grooves in a surface of the cylinder;

one of the grooves is assigned to one of the first and second positions and the other of the grooves is assigned to the other of the first and second positions;

the spring pushes the ball in projection from the surface of the cylinder in order to enter one of the grooves of the respective piston which has arrived in front of the ball; and the ball is able to be pushed back under an effect of a thrust exerted by the respective piston on the ball, in order to be lowered beneath the surface of the cylinder, compressing the spring and enabling release of the respective piston.

4. The transfer module according to claim 1, wherein the board is a steel plate, an upper side of the steel plate being non-reflective, and the steel plate is separated from the base by a heat-insulating plate.

5. A product manufacturing facility comprising:

a plurality of transfer modules; and a production line with workstations and conveying devices;

wherein:

each of the plurality of transfer modules is a passive module that comprises a frame compatible with the conveying devices of the production line and that is configured to be conveyed by the conveying devices to circulate between the workstations, thereby transferring a respective component between the workstations of the production line for the components to be processed in the workstations;

the frame carries a first plate that is provided with reference positions;

at least a subset of the reference positions are equipped with lowerable pins that are movable between a lowered position in which they are beneath a surface of the first plate and an extended position in which they are extended out of the first plate so as to receive the respective component and hold the respective component on the first plate;

the first plate is formed by (a) a honeycomb-shaped base and (b) a board that is provided with bores at the reference positions;

recesses of the honeycomb-shaped base correspond to the bores of the board at the reference positions;

one or more of the recesses are equipped with respective ones of the lowerable pins that are inserted into respective ones of the bores of the board;

the frame includes a second plate, the second plate being a carrier plate having bores or openings;

each respective one of the lowerable pins is integrated into a respective block that is held by the carrier plate and that is housed in a respective one of the recesses of the base;

the respective block is a cylinder that accommodates a respective piston that:

(a) is provided with the respective lowerable pin of the respective block;

(b) is movable between (1) a first position in the cylinder corresponding to the extended position of the respective lowerable pin and (2) a second position in the cylinder corresponding to the lowered position of the respective lowerable pin; and (c) is retained in whichever one of the first and second positions the respective piston occupies by a clip-in holding device that is configured to interact with the respective piston; and the bores or openings of the carrier plate enable access to the respective pistons of the respective blocks.

6. The product manufacturing facility according to claim 5, further comprising a management unit that controls movement of the conveying devices and operations carried out in the workstations according to a predefined program.

7. The product manufacturing facility according to claim 5, further comprising:

an activation device for the plurality of transfer modules, the activation device being configured, when a respective one of the transfer modules is positioned at the activation device, to actuate one or more respective blocks of respective one of the transfer modules and extend their respective lowerable pins according to the respective component to be received on the respective one of the transfer modules.

8. The product manufacturing facility according to claim 7, wherein the activation device includes two longitudinal rails that (a) surround a receiving point of the plate of the respective one of the transfer modules positioned at the activation device and (b) carry a transverse rail provided with a transverse slide that is equipped with an actuator to arrive at a position of a selected reference position of the plate to push the respective piston and extend the respective pin of the respective block from the selected reference point.

9. The product manufacturing facility according to claim 8, wherein the transverse rail is carried by two longitudinal slides that are driven synchronously on the longitudinal rails by a screw-and-nut gearbox that is assigned to each slide and its longitudinal rail and is driven by a motor and a transverse shaft that is connected to two screws, wherein the transverse slide is driven by the screw-and-nut gearbox that is integrated into the transverse rail and actuated by a motor carried by the transverse rail.

10. The product manufacturing facility according to claim 8, further comprising a device for returning to an initial state in which extended pins of the plate of one of the transfer modules are lowered, wherein the device includes a plate for retracting all pins of the plate of the one of the transfer modules to a plane of an upper side of the plate of the transfer module.

11. The product manufacturing facility according to claim 5, further comprising contains a dispensing station that includes a removal and cleaning station, which has a portal frame with a rail that covers the transfer module that has arrived in the dispensing station, and is provided with a slide that is equipped with a gripping device upstream and a cleaning device downstream, to place the gripping device over the transfer module and remove the component from the transfer module to provide an empty transfer module, and then to displace the gripping device to remove the component and simultaneously activate the cleaning device as the cleaning device passes over the empty transfer module to clean the empty transfer module.

12. The product manufacturing facility according to claim 11, wherein the gripping device has a gripping head with suction cups supplied with negative pressure, and the cleaning device contains an air nozzle supplied with compressed air.

* * * * *